Patented Jan. 24, 1950

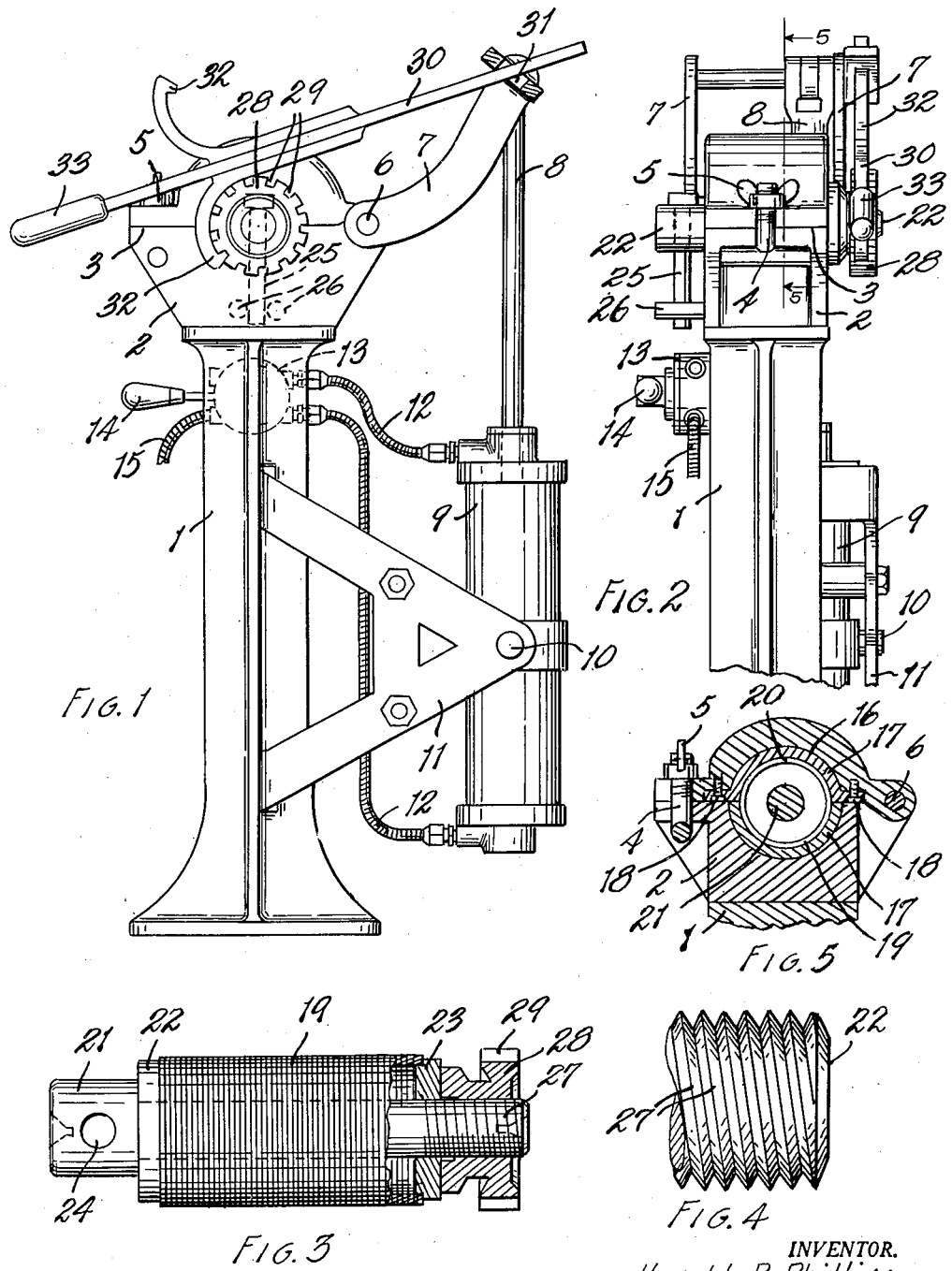

2,495,475

UNITED STATES PATENT OFFICE 2,495,475

AIR WRENCH

Harold P. Phillips, Hastings, Mich., assignor to Hastings Manufacturing Company, Hastings, Mich.

Application September 27, 1946, Serial No. 699,738

4 Claims. (Cl. 29—269)

This invention relates to improvements in an air wrench.

The principal objects of this invention are:

First, to provide a fixture for utilizing air or other fluid pressure to tighten or loosen work pieces on a threaded arbor.

Second, to provide a fluid pressure operated fixture arranged to radially close the gaps of a series of piston ring blanks and clamp the blanks axially around a threaded arbor so that the gaps will remain closed after the radial clamping force is removed.

Third, to provide a fixture for clamping piston ring blanks axially on an arbor with more force than may be applied by manual methods.

Other objects and advantages relating to the invention will be apparent from the description to follow. The invention is further pointed out in the claims.

The drawings, of which there is one sheet, illustrate a preferred form of my fixture.

Fig. 1 is an end elevational view partially broken away in cross section of my fixture shown in work tightening position.

Fig. 2 is a fragmentary front elevational view of the fixture shown in Fig. 1.

Fig. 3 is a plan view partially broken away in cross section of the arbor and work pieces adapted to be clamped thereon by my fixture.

Fig. 4 is a fragmentary detailed view of the thread on the end of the arbor.

Fig. 5 is a fragmentary cross sectional view along the plane 5—5 in Fig. 2.

In the manufacture of piston rings it is often the practice to form a series of piston ring blanks with a split or gap cut therein and to then clamp a stack of these blanks together by first applying radially inwardly directed pressure to close the gaps and then applying axially directed pressure on the ends of the stack by clamping the rings on an arbor to maintain the gaps in closed position while a turning operation is performed on the outer surface of the blanks. Since the axially directed pressure is the only force preventing the rings from springing open at the gaps after the radial pressure is released it is necessary that this axial pressure be extremely high. While it is possible for workmen to manually tighten nuts on threaded arbors for applying this axial pressure, it has been found that toward the end of a work period the men become tired and either slow down or insufficiently tighten the nuts thus causing many of the rings to be damaged in the turning operation.

My wrench is particularly designed to permit convenient use of air or other fluid pressure for applying the axially directed clamping action to a stack of piston ring blanks. The fixture may obviously be used for clamping other items or for tightening nuts in other connections.

My fixture consists of a base 1 on top of which is mounted a work holding head 2 which is split as at 3 and provided with a manually operable, quick locking bolt 4 and wing nut 5 for locking the two sections of the head together. The two sections of the head are pivotally connected by pin 6 which also pivotally supports the open ends of a yoke member 7 at the back of the head.

The center piece of the yoke 7 is pivotally connected to the end of a piston rod 8 which extends downwardly into a double acting air cylinder 9. The cylinder is pivotally mounted at 10 on a bracket 11 secured to the base 1. Air conduits 12 connect the opposite ends of the cylinder with a three-way valve 13 mounted on the side of the base and provided with an operating handle 14. An air supply conduit 15 is arranged to supply air under pressure to the valve 13.

The two halves of the head 2 define a cylindrical passage 16 therethrough within which is positioned a split bushing 17, the upper half of which is secured to the head by machine screws 18. The bushing 17 is arranged to receive and by closing around a series of piston ring blanks 19 as shown in Fig. 5 to compress the rings until their gaps are closed as at 20. The split bushing 17 is made removable from the head so that bushings of different thickness may be mounted in the head to accommodate ring blanks of varying diameters.

An arbor 21 of smaller diameter than the ring blanks 19 extends through the head and is provided with a collar 22 which engages one end of the stack of blanks and a removable end plate 23 which slips over the threaded end of the arbor and engages the outer end of the stack of blanks.

One end of the arbor 21 is apertured as at 24 to receive a drift pin 25 engageable between the stops 26 formed on the lower side of the head 2. The other end of the arbor is threaded as at 27 to receive a nut 28 for clamping the removable plate 23 against the stack of ring blanks. As is more particularly shown in Fig. 4, the threaded portion 27 of the arbor is double threaded to provide a maximum of axial movement with a minimum of radial movement.

The end of the nut 28 defines a series of square teeth 29 therearound which are engageable with the jaws of a spanner wrench 30. The end of the spanner wrench is engageable with a slot 31 formed in the end of the cross piece of the yoke 7. The spanner is provided with right and left hand hooks 32 so that it may be used either for tightening or loosening the nut 28. A handle portion 33 is provided for positioning the spanner on the desired side of the nut.

From the above description it should be apparent that the stack of piston rings 19 may be placed within the cylindrical bushing 17 either before or after the arbor 21 is passed through the rings. The top half of the head 2 may then be closed and tightened by adjusting the wing nut 5 to close the gaps 20 of the ring blanks. The end plate 23 is then placed around the arbor and partially drawn down by hand with the nut 28. A drift pin 25 is then dropped through the hole 24 in the arbor and between stop pins 26 and the spanner 30 is lifted over the head of the nut 28. Air pressure is then admitted to the upper side of the air cylinder 9, by operation of the valve handle 14 causing piston rod 8 to draw down the yoke 7 and the end of the spanner 30 imparting a clock-wise or tightening rotation to the nut 28. It will be appreciated that the air pressure will tighten the nut much tighter than could be accomplished by hand.

After the arbor with the ring blanks thereon is removed from the fixture and the turning operation performed on the blanks it may be replaced in the fixture as described above, and the upper jaw of the spanner engaged with the nut 28. Application of air pressure to the lower end of the cylinder will then loosen the nut on the arbor permitting its easy disassembly by hand.

I have described my invention in a highly practical embodiment thereof as applied to a particular type of work so that others may reproduce the same for like or similar types of work.

Having thus described my invention, what I claim as new and desire to secure by Letters Patent, is:

1. A fixture for applying radial aligning and clamping force to a series of piston rings and for tightening and loosening a nut on an arbor extending through said rings to apply axial pressure to said rings comprising, an arbor having a hole in one end thereof and a nut threaded on the opposite end thereof, said nut having radially opening notches in the periphery thereof, a pedestal-like base, a split head on said base forming an elongated cylindrical aperture adapted to receive a multiplicity of said rings with said arbor arranged therethrough, and having its two parts pivotally connected, a manually operable quick acting pivotally mounted bolt for clamping the parts of said head together, a split bushing positioned in said aperture and arranged to engage and align said rings when said head is closed, a yoke pivotally mounted on said head co-axially with the pivotal connection of said head, stop members on one end of said head, a pin adapted to be passed through said hole in said arbor to nonrotatably engage said stops, a double acting fluid pressure cylinder pivotally mounted on said base, in a generally vertical position and having its piston pivotally connected to the cross piece of said yoke, conduits for supplying fluid under pressure to the ends of said cylinder, a valve for selectively controlling the delivery of fluid to said conduits, an extension on the cross piece of said yoke forming a slot at the opposite end of said head from said stops, and a double jaw spanner wrench having one end slidably engageable in said slot and having a handle on its other end projecting beyond its jaws, said jaws being adapted to selectively engage said nut on said arbor and having teeth engageable with the notches in said nut for selectively applying both right and left hand turning motion to said nut responsive to angular motion of said yoke by said cylinder.

2. A fixture for applying radial aligning and clamping force to a series of piston rings and for tightening and loosening a nut on an arbor extending through said rings to apply axial pressure to said rings comprising, an arbor having a hole in one end thereof and a nut threaded on the opposite end thereof, said nut having radially opening notches in the periphery thereof, a pedestal-like base, a split head on said base forming an elongated cylindrical aperture adapted to receive a multiplicity of said rings with said arbor arranged therethrough and having its two parts pivotally connected, a manually operable quick acting pivotally mounted bolt for clamping the parts of said head together, a split bushing positioned in said aperture and arranged to engage and align said rings when said head is closed, a yoke pivotally mounted on said head co-axially with the pivotal connection of said head, stop members on one end of said head, a pin adapted to be passed through said hole in said arbor to nonrotatably engage said stops, a double-acting fluid pressure cylinder pivotally mounted on said base and having its piston pivotally connected to the cross piece of said yoke, conduits for supplying fluid under pressure to the ends of said cylinder, a valve for selectively controlling the delivery of fluid to said conduits, an extension on the cross piece of said yoke forming a slot at the opposite end of said head from said stops, and a spanner wrench having one end slidably engageable in said slot and having a handle on its other end projecting beyond its jaw, said jaw being adapted to selectively engage said nut on said arbor and having a tooth engageable with the notches in said nut for selectively applying both right and left hand turning motion to said nut responsive to angular motion of said yoke by said cylinder.

3. In combination with a fixture for applying radial aligning and clamping force to a series of piston rings and an arbor adapted to extend through said rings to apply axial pressure to said rings, said arbor having a hole in one end thereof and a nut threaded on the opposite end thereof, said nut having radially opening notches in the periphery thereof, said fixture having stops on one end thereof adapted to nonrotatably engage a pin passed through the hole in said arbor, mechanism for tightening and loosening said nut comprising, a lever pivotally mounted on said fixture at a point spaced from said arbor, a double acting fluid pressure cylinder pivotally mounted on said fixture in a generally vertical position and having its piston pivotally connected to the swinging end of said lever, conduits for supplying fluid under pressure to the ends of said cylinder, a valve for selectively controlling the delivery of fluid to said conduits, the swinging end of said lever forming a slot at the opposite end of said head from said stops, and a spanner wrench having one end slidably engageable in said slot and having a handle on its other end projecting beyond its jaw, the jaw of said wrench being adapted to engage said nut on said arbor and having teeth engageable with the notches in said nut for selectively applying both right and left hand turning motion to said nut responsive to angular motion of said yoke by said cylinder.

4. In combination with a fixture for applying radial aligning and clamping force to a series of piston rings and an arbor adapted to extend through said rings to apply axial pressure to said rings, said arbor having a hole in one end thereof and a nut threaded on the opposite end thereof, said fixture having stops on one end thereof adapted to nonrotatably engage a pin passed through the hole in said arbor, mechanism for tightening and loosening said nut comprising, a lever pivotally mounted on said fixture, a double acting fluid pressure cylinder pivotally mounted on said fixture and having its piston pivotally connected to the swinging end of said lever, conduits for supplying fluid under pressure to the ends of said cylinder, a valve for selectively controlling the delivery of fluid to said conduits, the swinging end of said lever forming a slot at the opposite end of said head from said stops, and a wrench having one end slidably engageable in said slot, the jaw of said wrench being adapted to engage said nut on said arbor for selectively applying both right and left hand turning motion to said nut responsive to angular motion of said yoke by said cylinder.

HAROLD P. PHILLIPS.

REFERENCES CITED

The following references are of record in the file of this patent:

UNITED STATES PATENTS

| Number | Name | Date |
| --- | --- | --- |
| 1,765,825 | Cork | June 24, 1930 |
| 1,778,055 | Alinder et al. | Oct. 14, 1930 |
| 1,884,874 | Ross | Oct. 25, 1932 |
| 2,257,330 | Brouwer | Sept. 30, 1941 |